H. C. ALFORD.
PROCESS OF TREATING RESINOUS WOODS.
APPLICATION FILED JULY 11, 1914.

1,206,283.

Patented Nov. 28, 1916.
3 SHEETS—SHEET 2.

WITNESSES:
Harry A. Binner
Jos a michel

INVENTOR.
Harvey C. Alford.
BY
Emil Stark
ATTORNEY.

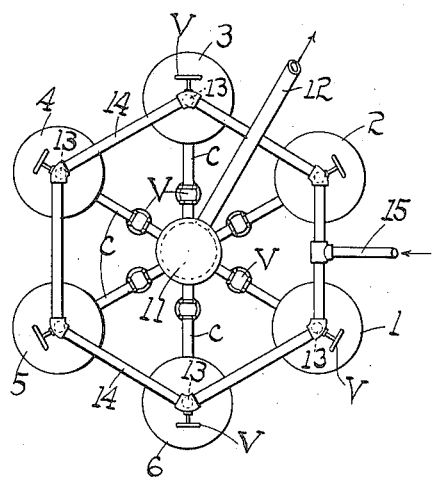
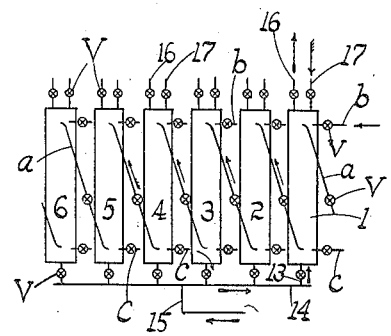
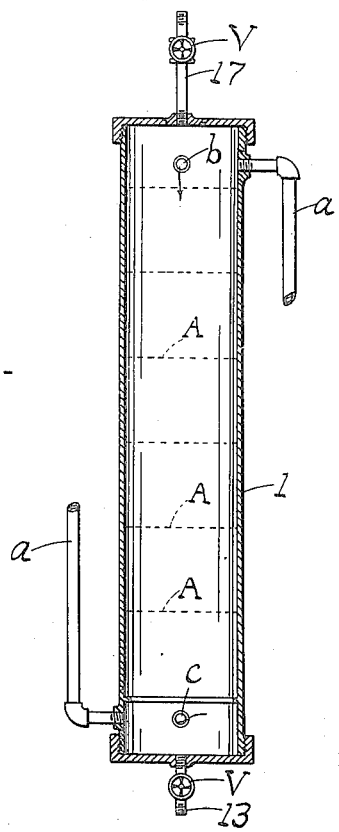
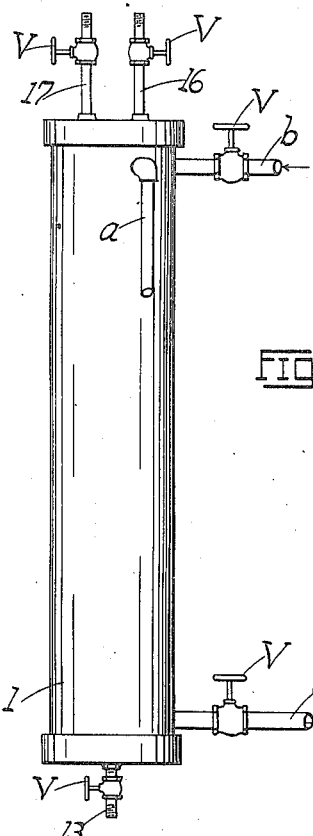

UNITED STATES PATENT OFFICE.

HARVEY CARROLL ALFORD, OF MOBILE, ALABAMA, ASSIGNOR TO JOSEPH M. WALSH AND BENJAMIN THURLEY, BOTH OF MOBILE, ALABAMA, AND H. CARROLL ALFORD, OF BALDWIN COUNTY, ALABAMA, TRUSTEES.

PROCESS OF TREATING RESINOUS WOODS.

1,206,283.      Specification of Letters Patent.      Patented Nov. 28, 1916.

Application filed July 11, 1914. Serial No. 850,435.

*To all whom it may concern:*

Be it known that I, HARVEY CARROLL ALFORD, a citizen of the United States, residing at Mobile, in the county of Mobile and State of Alabama, have invented certain new and useful Improvements in Processes of Treating Resinous Woods, of which the following is a full, clear, and exact description, reference being had to the accompanying drawings, forming a part hereof.

The present invention is directed to the preparation of resinous woods for the manufacture of chemical paper pulp.

Among the objects sought are (1) the removal of the resin without saponification, thereby dispensing with the necessity of washing out the resulting resin soaps; (2) the removal of the resins by subjecting the same to the action of natural solvents at temperatures not destructive of the fiber thereby leaving the latter in fit condition for the manufacture of paper or paper pulp; (3) the treatment of woods rich in resin, thereby not only extracting the resin, but leaving the wood in excellent condition for subsequent digestion; (4) the digestion of the wood without the presence of resin, making the elimination of the humus a comparatively easy matter; (5) the easy and ready recovery of the alkali solution by which the digestion is effected; (6) the treatment of waste wood which can not be successfully treated by prevailing methods; (7) the simplification and reduction of cost in the treatment of the wood both for purposes of resin extraction and the digestion thereof for paper manufacture.

A further object is to provide a process which shall be continuous and self-contained, the solvents used for one charge being substantially recovered for use on subsequent charges; one which will operate on a maximum charge in a minimum amount of time; one which does not require an expert to operate the apparatus by which the process is carried on; and one possessing further and other advantages better apparent from a detailed description of the invention, which is to follow.

In practising my invention, no special form of apparatus need be adhered to, but in the illustrations herein is shown one form which I have found eminently desirable in practice, and in connection with which the details of the process may be described.

Figure 1:
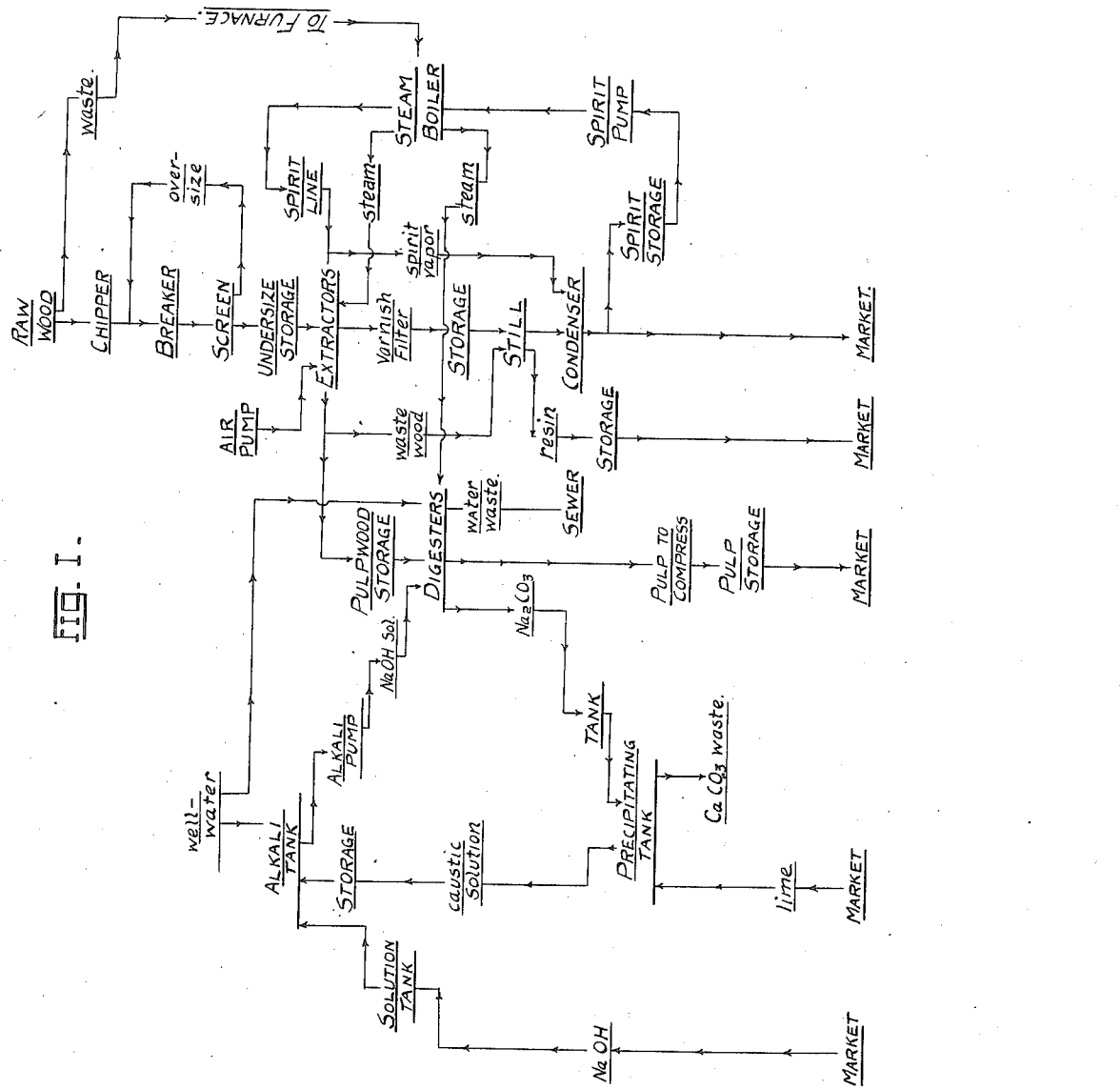
Figure 2:
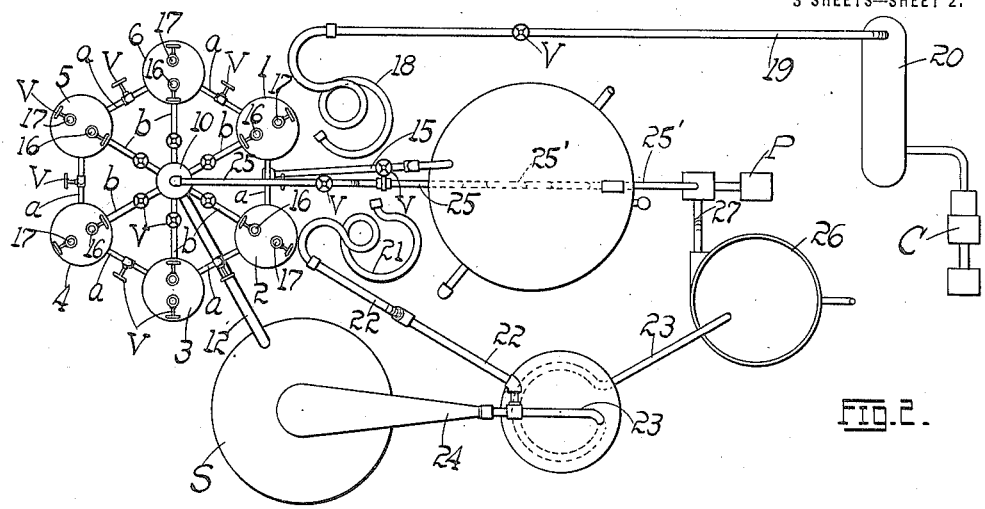
Figure 3:
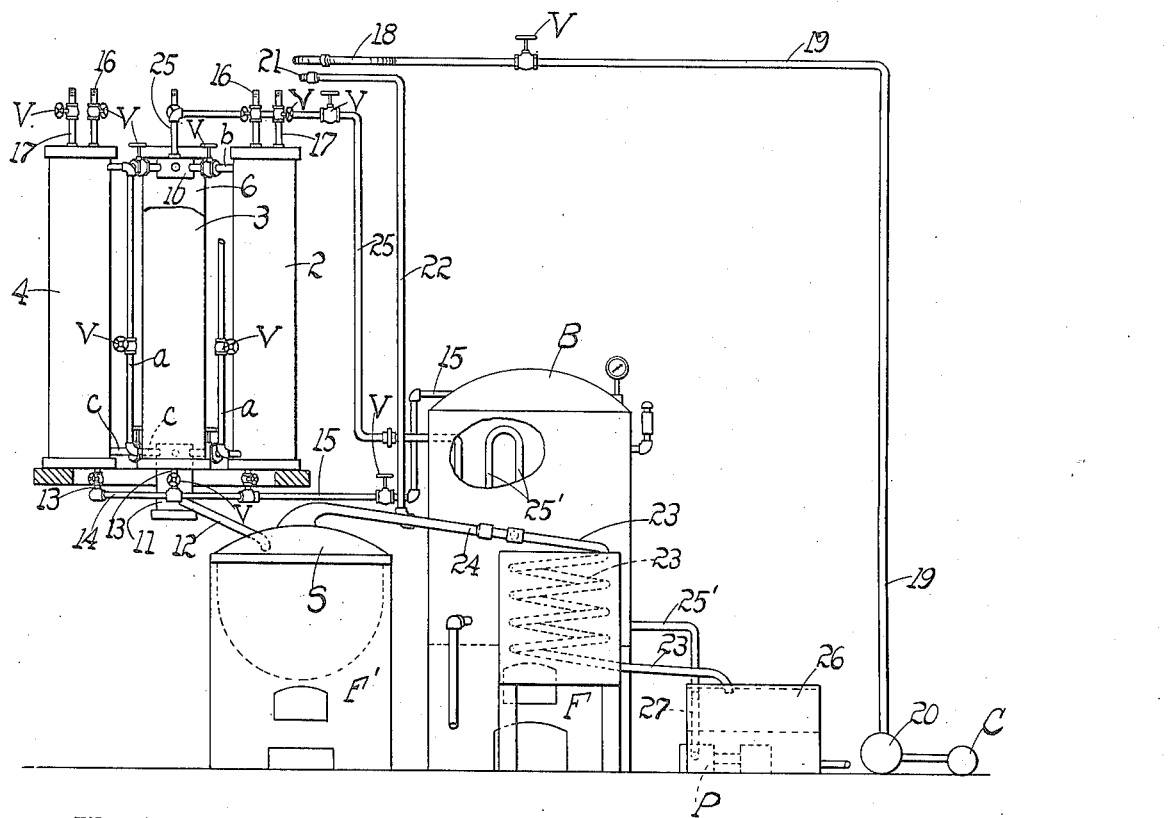

In the drawings, Figure 1 illustrates a flow sheet showing in a general way the travel of the various products directly or indirectly involved in the process; Fig. 2 is a top plan, more or less diagrammatic, of the apparatus directly involved in the carrying on of the process; Fig. 3 is an elevation of Fig. 2; Fig. 4 is a bottom plan of the containers shown in Figs. 1 and 2; Fig. 5 is a longitudinal middle section of one of the containers; Fig. 6 is an elevation thereof, viewed at right angles to the section shown in Fig. 5; and Fig. 7 is a diagrammatic elevation of the series of containers, showing the course of travel of the fluids therethrough.

Referring to the drawings, and for the present to Figs. 1 to 6 inclusive, 1, 2, 3, 4, 5, 6, represent a series (six in the present example, though any number is contemplated by my invention) of containers, cylindrical extractors or equivalent treatment vessels, preferably disposed about a common axis or center, the several containers being coupled together circumferentially by valve-controlled circulating pipes $a$ tapping respectively one container at the bottom and the adjacent one at the top, whereby the fluid contents of the containers may be caused to circulate from one container to another for a purpose presently to appear. Leading radially inward from the upper ends of the several containers toward the common axis of the series, and opening into a common drum or chamber 10 located on said axis, are valve-controlled circulating pipes $b$, there being a corresponding set of radial bottom pipes $c$ opening into an axially disposed bottom chamber or collecting drum 11 from which leads a discharge pipe 12. Tapping the bottoms of the several containers are valve-controlled short pipes 13 which open into a circumferentially disposed steam circulating pipe or "coil" 14, preferably made of a series of short pipes connected to suitable T's or fittings which likewise serve to receive the adjacent ends of the pipes 13 (Figs. 3, 4). Of course these features are all within the purview of the skilled mechanic, and not here claimed. The pipe or "coil" 14 is supplied with steam from a steam-pipe 15 leading from a suitable flue boiler B. Leading from the heads of the containers 1 to 6, are valve-controlled pipes 16, 17, disposed in pairs, the pipe 17 of any container being adapted to be coupled to the terminal flexible hose 18 of a valve-controlled air line 19 leading from the storage tank 20 supplied with air under pressure from a compressor C, and the pipe 16 being adapted to be coupled to the flexible hose terminal 21 of the vapor line 22 which branches off from the condenser coil 23 at a point beyond the end of the discharge leg 24 of the still S into which the pipe 12 conducts the resin solution from the bottom collecting chamber or drum 11. Leading from the top of the drum or chamber 10 is a valve-controlled spirit line 25 which continues through the boiler B in the form of a coil extension 25' insuring a rapid circulation and a correspondingly rapid heating of the turpentine. The condenser 23 discharges into a storage vessel 26 in which the turpentine spirit separates from the water which settles on the bottom of the vessel or tank, the turpentine being drawn off by a pipe 27 near the top, and by means of a pump P forced through the coil 25' traversing the boiler B where it is rapidly heated, and through the line 25 into the drum 10 as more fully hereinafter explained. It will be seen that the discharge end of the pump P is connected to the lower end of the coil 25' which extends outside of the boiler to permit of ready connection with the pump cylinder. Wherever valves occur they are represented by the reference V and are of the ordinary globe or similar variety.

The operation of the system involves a succession of steps which will be readily understood from the figures referred to, supplemented by the showing in Fig. 7 which is in the nature of a diagrammatic development of the extractors or containers 1, 2, 3, 4, 5, 6. In said Fig. 7, the parts illustrated correspond with similar parts in the other figures and are designated by similar reference symbols. It may also be convenient to refer to the flow sheet represented by Fig. 1 in which are outlined the relations of some of the steps of the process not having an immediate bearing on the apparatus herein described, and for an understanding of which steps no illustration of any apparatus is considered necessary. In detail the operation of the invention is substantially as follows: The wood, both resinous and non-resinous is deprived of its bark as much as possible and then cut into chips in any suitable manner, preferably in a chipper machine, the waste being fed to the furnace F of the steam boiler B. From the chipper the chips are run through a breaker and then screened, the oversize passing back into the breaker. From the screen the undersize is delivered to a suitable storage bin whence it is charged into the extractors 1, 2, 3, 4, 5, 6. The turpentine or resin solvent is pumped from the spirit storage tank 26 by means of the pump P through the coils 25' traversing the boiler, where it is heated, the hot turpentine passing through the spirit line 25 to the containers or extractors. In the present embodiment of my invention let us assume that four containers 1, 2, 3, 4, are left in free communication with one another, containers 5 and 6 being temporarily cut off, by a proper manipulation of the valves V on the pipes $a$, $b$, and let us further assume that the valves of all the pipes 13 are closed and the valves of the pipes $c$ leading from the bottoms of the containers 1, 2, 3, 5, and 6 are closed, and that of container 4 is left open to discharge into the receptacle or drum 11. Let us further assume that all the valves V in the several radial pipes $b$ are closed with the exception of the pipe leading from the drum 10 to container 1, and that the valves in the circumferential series of pipes $a$ between the containers 1, 2, 3, and 4 are open. Under the circumstances the hot turpentine which enters the drum 10 flows into container 1 and thence traverses containers 2, 3, 4, in succession, the resin dissolved in one container being carried to the next adjacent container until it reaches container 4, whence it discharges through the pipe $c$ of said last container into the receptacle 11 whence the solution flows through pipe 12 into the still S, a suitable varnish filter and storage tank being preferably interposed between the containers and the still. From the still the distillate or turpentine vapors carry over to the condenser, the residue or resin from the still being delivered to a suitable storage and finally marketed. The turpentine enters container 1 at substantially 310 degrees Fahrenheit where it loses about 25 degrees in passing through the charge of wood therein, so that it enters container 2 at substantially 285 degrees Fahrenheit. Upon entering container 3 it may have dropped to 250 degrees temperature and down to 200 degrees when it enters container 4, the temperature of the solution initially discharging from said container being say in the neighborhood of 175 degrees Fahrenheit. The hot turpentine is forced through the containers for about fifteen minutes during which time the wood charge is continuously leached. Preferably the wood particles are charged into the containers in baskets having perforated bottoms A, the baskets being merely indicated as to position in Fig. 5 and not fully illustrated because forming no part of the present invention, each container holding six baskets. The continuous pumping of the turpentine through the containers (1, 2, 3, 4,) gradually raises the temperature of the contents of the containers to about 300 degrees Fahrenheit, said temperature being reached in the first container of the series. At the end of the fifteen minute period whatever turpentine is still in container 1 and is not held in the pores of the wood, is forced out by compressed air, the expulsion being effected by attaching the free end of the hose 18 leading from the air line 19 to the pipe 17 on container 1, the valve V of said pipe being opened. Upon opening the valve V of the air line, air under pressure will rush from the air tank 20 into the top of the container 1, (all the valves in the pipes $b$ and $c$ and in the pipes 16 being closed, as well as the valves of the pipes 17 of containers 2, 3, 4, and 6, that of the container 5 being left open to serve as an air vent) and force the loose turpentine and resin solution not held in the pores of the wood out of container 1 into container 2. To permit this expulsion however, container 5 must be admitted to the series by opening the valve in the pipe $a$ between containers 4 and 5.

The reason for admitting container 5 into the series during the expulsion of the liquid under the air pressure as described, is for the purpose of advancing the liquid contents of the original series (1, 2, 3, 4,) one container; that is to say, the liquid which is driven out of container 1 flows into container 2, the liquid from container 2 flowing into container 3, the liquid from container 3 being advanced into container 4, and the liquid from container 4 being advanced into container 5. In other words, the air pressure shifts the liquid contents of the containers (1, 2, 3, 4,) of the original series into the containers 2, 3, 4, 5, which, as presently to be explained, form the members of the next or succeeding series. To expel the liquor from the container 1 which adheres to, and saturates the wood therein, and which can not be effectively dislodged by the air current, resort is had to a current of steam from the boiler B. The steam is introduced through the bottom of the container 1, the expulsion of this last portion of liquor being however confined to said container 1 without affecting or disturbing the liquor in containers 2, 3, 4, 5. This is accomplished by removing the hose 18 and allowing any compressed air in the container to escape through the pipe 17 the valve whereof is temporarily left open, the valve in the pipe $a$ connecting containers 1 and 2 being closed. The said valve in the pipe 17 is then closed as are also the valves in the bottom pipes 13 leading from the containers 2, 3, 4, 5, and 6, the valve in the pipe 13 leading into the bottom of container 1 being of course left open. At the same time the valve in the steam pipe 15 is opened. The result is that steam from the boiler B, in which a pressure of substantially 60 pounds gage is maintained, and corresponding to substantially 315 to 320 degrees temperature (above the boiling point of turpentine) rushes into the container 1, evaporating the turpentine, the vapors escaping through the pipe 16 (whose valve is turned to open position) and through the vapor line 22 to the coil 23 of the condenser, to join the vapors discharged from the still S through the leg 24. The connections between the pipe 16 and vapor line 22 is effected through the flexible hose 21 forming an extension of the vapor line, the free end of the hose being passed over the end of the pipe 16. The steam from the pipe 15 removes the last vestige of liquor or turpentine saturating the wood particles, and when that stage is reached, the contents of the container are removed and a fresh charge of wood particles is introduced thereinto. Container 2 now forms the first member of the succeeding series of which container 5 is the last member, said last member having been added as already described by opening the valve in the pipe $a$ between containers 4 and 5, and opening the valve in the radial pipe $b$ between container 2 and the drum 10, and the valve in the pipe 25. This new series may be operated identically in the same manner as the original series which comprised the containers 1, 2, 3, 4. During the expulsion of the liquor from container 2 under the action of the air pressure, the container 6 is opened to the series 2, 3, 4, 5, and when container 2 is cut out from said series, container 3 will form the first member, and container 6 the last member of the next succeeding series (3, 4, 5, 6,). When later container 3 is cut out, then container 1 is made the last member of the next series whose first member is container 4, and so on in rotation until container 1 becomes the first member of the series. In this way the process is made continuous, the deresinated pulp wood of a container as it is cut out from a given series being removed and replaced by a fresh charge of wood to be acted on when that particular container is restored to any series. Of course this may be readily accomplished by a proper manipulation of the valves and does not require an expert to look after the system.

The pulp-wood from the several extractors, (that is to say the wood from which all the resin has been extracted) is preferably placed in storage, any waste from the latter being used as fuel for the furnace F' of the still S. The pulp-wood is then treated in digesters on the order of the cylindrical vessels forming the extractors (1, 2, 3, 4, 5, 6,) the waste water from which is conducted into the sewer or disposed of in any convenient manner. In the present embodiment of my invention the pulp-wood is entirely deresinated, and so deresinated, it is subjected to the action of a solution of a suitable alkali preferably caustic soda (NaHO), conducted from an alkali tank into which well water is admitted to effect the solution, an alkali pump being preferably employed to pump the NaHO solution into the digesters. These digesters may be arranged in series if desired, and operated very much on the order and in the sequence described therefor in connection with the extractors, but that is immaterial so far as my present invention is concerned. The caustic soda (or its equivalent) which is heated to some 325 to 360 degrees of temperature Fahrenheit, attacks the humus of the pulp-wood, which is mainly in the form of humic acid, a weak organic acid, easily converted into carbon dioxid ($CO_2$) in the course of the digesting process. The carbon dioxid converts the caustic soda into carbonate, thus, $2NaOH + CO_2 = Na_2CO_3 + H_2O$. The $Na_2CO_3$ or sodium carbonate (which is in solution) is conducted to a (storage) tank whence it flows into a precipitating tank to which is conducted milk of lime or quick lime, $Ca(OH)_2$, the latter converting the carbonate of sodium into caustic soda as per following reaction— $Na_2CO_3 + Ca(OH)_2 = 2NaOH + CaCO_3$. The water in the precipitating tank being non-carbonated, the carbonate of lime is insoluble therein thereby forming a precipitate which goes to waste. From the precipitating tank the regenerated caustic solution is conducted to a storage tank whence it is run into the alkali tank. The caustic alkali on the market is first deposited in a solution tank whence it is conducted to the alkali tank, the regenerated caustic solution maintaining the original solution in the alkali tank at substantially normal strength for use in the digesters (see flow sheet Fig. 1). The flow-sheet in Fig. 1 need not of course be adhered to, and may be varied to suit conditions, but it should always be of such character as to cover a process in which deresinated wood is subjected to the action of a caustic alkali to rid the wood of humus and its attendant acid.

Under my process the heating of the material (pulp-wood) is progressive, and the extraction of the resin solution (or turpentine-resin varnish) is progressive, while its discharge is continuous. The wood is not burned or overheated by my process during the extraction of the resin therefrom; the process avoids saponification of the resin content of the wood; the time of treatment is shortened; the alkali used in the digestion of the pulp-wood is changed to the carbonate and there is little of it in volume. This fact admits of ready conversion of the carbonate to the oxid or hydrate of sodium, because reasonably pure in the state of carbonate. The process lends itself to the treatment of lean woods and waste woods; it recovers the resins in a condition which leaves the same available for the manufacture of varnishes or for use in any art where resins are used; it leaves the pulp-wood in a condition eminently amenable to treatment in making wood-pulp. The feature of the recovery of the turpentine by steam vaporizing the turpentine occluded in the wood of the charge, and carrying off the turpentine as vapor in the steam vapor passed to the condenser, is believed to be new.

It will be seen from the foregoing that the containers 1, 2, 3, 4, 5, 6, form a cycle of extractors, a portion of which have their pulp-wood content treated at one time. In the present example four containers are always traversed by the solvent (turpentine) the entire fluid content of the four containers being advanced (by the air pressure) one container after which the first container of the series from which the advance was made, is cut out. That is to say when container 5 is opened to container 4, then container 1 is cut out, the pulp-wood of the latter being transferred to a digester; when container 6 is opened to container 5, then container 2 is cut out, and so on until the cycle of operations is completed. This "cycle" may of course be repeated indefinitely. Thus the fluid content of the series of containers in operation is periodically advanced one container, the first container being always cut out. In this way the solvent progressively traverses all the containers of the cycle.

Having described my invention, what I claim is:—

1. In the treatment of resinous woods, the process of subjecting a charge of deresinated wood particles while hot to the action of caustic soda whereby the latter is converted into carbonate, removing said carbonate solution, and adding thereto an oxid or hydrate of an alkaline earth whereby the caustic soda is regenerated.

2. In the treatment of resinous woods, the process of subjecting a charge of wood particles confined in a series of intercommunicating containers, to the action of a hot resin solvent traversing the several containers, driving the solution from the first container into the second container of the series, cutting out the first container from the series, whereby the second becomes the first container of a new series to receive the solvent, adding a new terminal container at the end of said new series for each first container cut out from a preceding series, and repeating the operation until the first container of the original series is reached whereby the process is continuous, and whereby each container receives the solvent at progressively increasing temperature, removing the resin solutions from any series by discharging the same from the last container of such series, distilling the solution, heating the solvent distillate, and utilizing the same for subsequent operations.

3. In the treatment of resinous woods, the process of subjecting a charge of wood particles confined in a series of intercommunicating containers, to the action of a hot resin solvent traversing the several containers, driving the solution from the first container into the second container of the series, cutting out the first container from the series, whereby the second becomes the first container of a new series to receive the solvent, adding a new terminal container at the end of said new series for each first container cut out from a preceding series, and repeating the operation until the first container of the original series is reached whereby the process is continuous, and whereby each container receives the solvent at progressively increasing temperature, removing the resin solutions from any series by discharging the same from the last container of such series during the passage of the solvent therethrough, and regenerating and heating the solvent for subsequent operations.

4. In the treatment of resinous woods, the process of subjecting the wood while confined in a series of intercommunicating containers to the action of a hot resin solvent traversing the several containers, bringing a fresh container into the series at the end of the first series, advancing the free liquor in the containers under pneumatic pressure until the free liquor is expelled from the first container of the series, discontinuing the pneumatic pressure, cutting off the first container from the series, steaming the contents thereof to expel all adhering solvent and solution, then repeating the operation on the succeeding series in which the fresh container aforesaid temporarily brought into the first series becomes the last member of the series, and the second container of the original series becomes the first member of the second series, and repeating the operation continuously.

5. In the treatment of wood for the manufacture of wood pulp, the process of subjecting a charge of deresinated pulp-wood while hot to the action of caustic soda, removing the resulting sodium carbonate, adding a hydrate of an alkaline earth to said sodium carbonate, thereby regenerating the caustic soda, and removing the resulting alkaline-earth carbonate.

6. In the treatment of resinous wood, the process of subjecting a charge of the wood in a container to the traverse of a current of hot turpentine, cutting off said current, subjecting the contents of the container to pneumatic pressure to expel certain portions of the contained liquid, then subjecting the charge to the action of a current of steam at a temperature sufficient to vaporize the remaining liquid contents of the container, thereby leaving the pulp-wood in condition for subsequent treatment.

7. In the treatment of resinous wood, the process of subjecting a charge of the wood in a container to the action of a positively impelled current of hot turpentine, running off a portion of the liquor by the driving pressure of the dissolving current, driving off another portion by pneumatic pressure, and vaporizing a third portion under a current of steam traversing the charge.

In testimony whereof I affix my signature, in presence of two witnesses.

HARVEY CARROLL ALFORD.

Witnesses:
 MEYER E. METZ,
 R. R. WOOD.